United States Patent [19]

Goodfellow

[11] Patent Number: 4,792,370
[45] Date of Patent: Dec. 20, 1988

[54] TIRE BUILDING METHOD EMPLOYING DETACHABLE TRANSFER BOX

[75] Inventor: Anthony G. Goodfellow, Maghull near Liverpool, United Kingdom

[73] Assignee: Apsley Metals Limited, United Kingdom

[21] Appl. No.: 81,745

[22] Filed: Aug. 5, 1987

[30] Foreign Application Priority Data

Aug. 12, 1986 [GB] United Kingdom ............... 8619617

[51] Int. Cl.4 .............................................. B290 30/08
[52] U.S. Cl. ..................................... 156/111; 156/127; 156/396
[58] Field of Search ............... 156/111, 123, 124, 126, 156/127, 130, 133, 396, 405.1, 406.2, 406.4

[56] References Cited

U.S. PATENT DOCUMENTS

| 2,407,152 | 9/1946 | Haase | 156/111 |
| 3,442,746 | 5/1969 | Robertson | 156/111 X |
| 3,532,577 | 10/1970 | Niclas et al. | 156/396 X |
| 4,204,903 | 5/1980 | Alexander | 156/126 X |
| 4,268,330 | 5/1981 | Komatsu et al. | 156/111 |

FOREIGN PATENT DOCUMENTS 2158400 11/1985 United Kingdom ............... 156/396

Primary Examiner—Michael W. Ball
Assistant Examiner—Geoffrey L. Knable
Attorney, Agent, or Firm—Stevens, Davis, Miller & Mosher

[57] ABSTRACT

A method of manufacture of a pneumatic tire in which an annular component, such as a tread/breaker assembly, is accurately located in a supporting box (30)(15). Other tire components such as sidewalls, and carcass, are assembled to said annular component while it is held in the box. The box (15) (30) is a transfer box which is detachable from a rotatable conveyor (11) for relocation in turn at each of a number of tire building stations (16)(26)(36) to pick a respective component(s) at each station. After picking up the respective component(s) at a station the box (15)(30) returns to the conveyor (11) for movement of the box to the next building station.

7 Claims, 2 Drawing Sheets

TIRE BUILDING METHOD EMPLOYING DETACHABLE TRANSFER BOX

This invention relates to a method of manufacture of pneumatic tires.

Vehicle tires are assembled from many different components each of which are intended to be precisely located in the completed tires. Conventionally radial carcass tires are built in two stages, a carcass is built on a cylindrical flat drum and is shaped into a toroidal configuration within an already assembled breaker belt package so as to assemble the carcass to the breaker package; other components such as sidewalls, treads, apexes, etc., can be added at either the cylindrical flat stage or at the shaped stage. It will be appreciated that it is difficult to maintain the relative positions between the various components added to the tire at the different stages.

The present invention provides a means for an improvement in the location of tire components relative to each other and ensures accuracy of assembly.

Accordingly there is provided a method of manufacture of a pneumatic tire in which an annular component is accurately located in a sppporting box and other tire components are arranged coaxially of the annular component and are assembled thereto while said component is held in the box. Preferably said method including building an annular component at a. first tire building station, and transferring the annular component by a conveyor means to said plurality of other tire building stations, wherein said box is a transfer box which is detachable from the conveyor means for relocation at a position adjacent to and coaxial with the component at the first building station for pick-up of said component, whereupon the transfer box is returned to a location on the conveyor means, for subsequent conveyance of both transfer box with component in-situ to other tire building stations.

Preferably other tire components are added to said component while said component is located in the box. Also according to another aspect of this invention there is provided an apparatus which may be used for the performance of the above method, said apparatus comprising a conveyor means having a plurality of positions thereon at each of which a transfer box is locatable, the transfer box being movable by the conveyor means between a plurality of tire building stations, characterized in that the transfer box is detachalle from the conveyor means and is movable to one of said tire building stations to collect a component therefrom, the transfer box being accurately relocatable on the conveyor means for conveyance of the transfer box with component in-situ to a second tire building station.

The invention will be described by way of example and with reference to the accompanying drawing in which.

Figure 1:
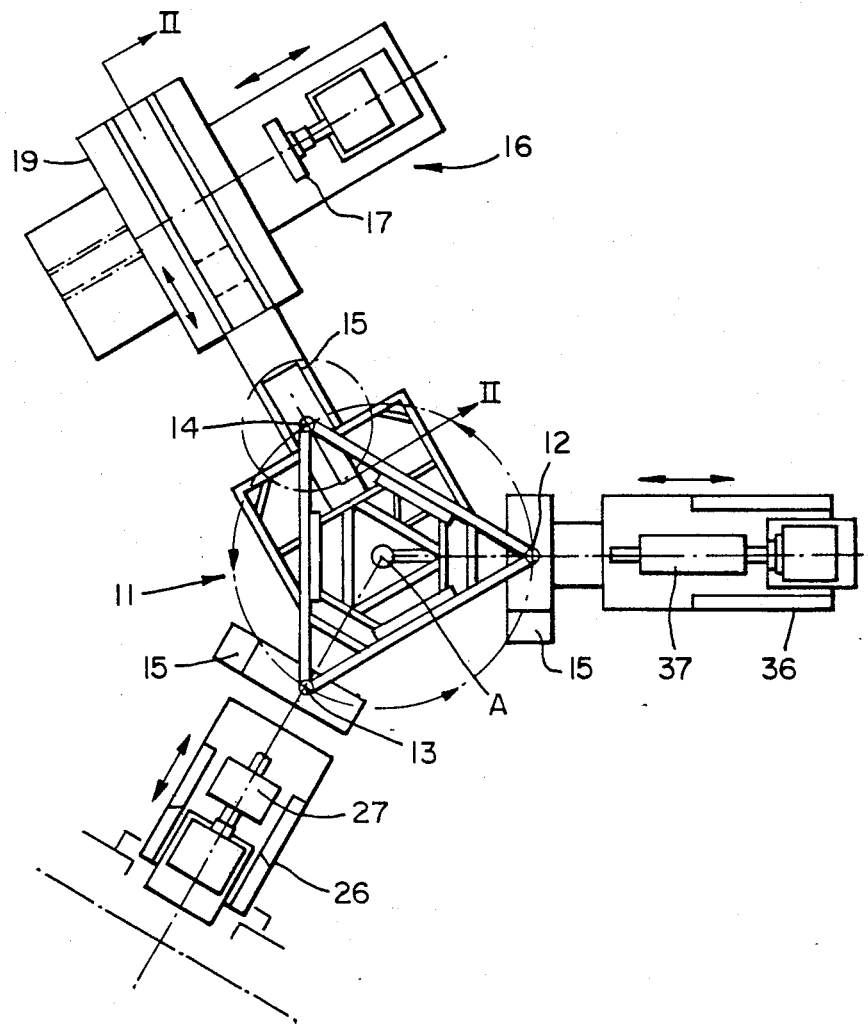
FIG. 1 is a schematic plan view of an apparatus according to this invention.
Figure 2:
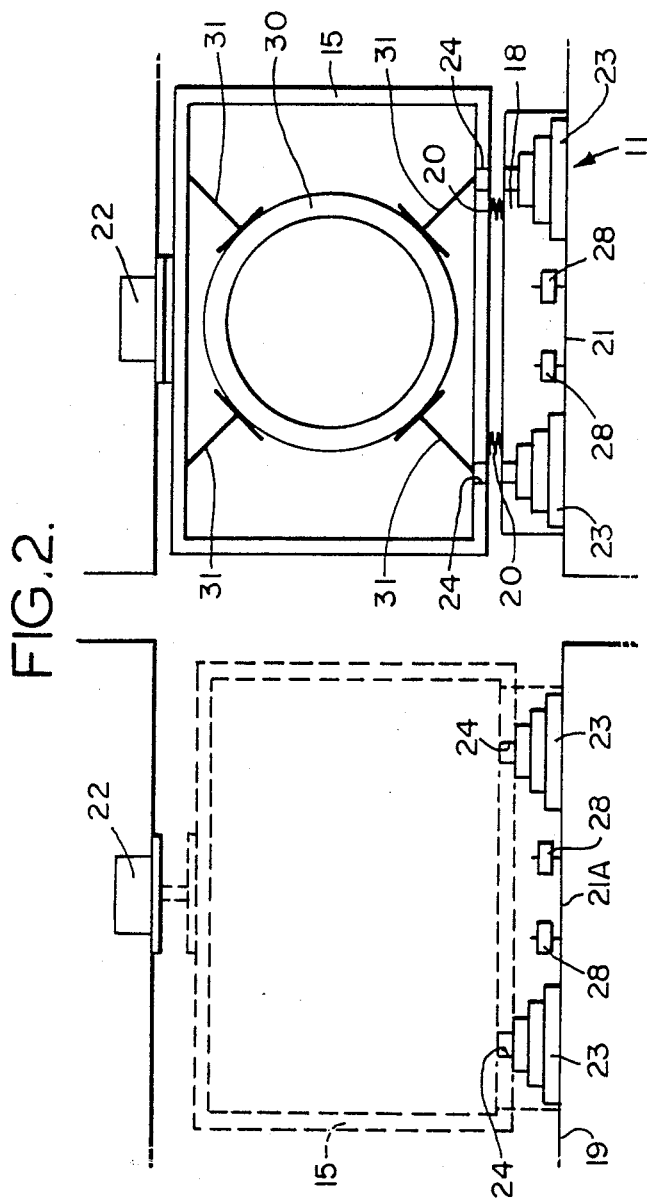
FIG. 2 is a schematic view on the line II—II of FIG. 1.

With reference to FIG. 1 and FIG. 2, there is illustrated an apparatus forming part of a tire building process. A conveyor, for example, in the form of a rotatable turret 11 is capable of indexing between a plurality of circumferentially spaced positions, preferably three positions, the three positions each being aligned with tire building machines 16, 26 or 36, which add various components to a tire being assembled on the apparatus. The turret 11 has three equiangularly spaced locations 12, 13, 14 thereon each of which is capable of accommodating a transfer box 15. While each location 12, 13 and 14 on the turret 11 preferably has a transfer box 15 fitted in position, the apparatus is operable with only a single transfer box 15 in one location on the turret and which is transferred to each circumferentially soaced position in turn. Each transfer box 15 is rotatably mounted on the turret 11 so that the box 15 can be oriented as desired with respect to a radius struck from the axis of rotation 'A' of the turret 11.

In the present apparatus, the transfer box 15 is utilized for the pick-up of a breaker/tread assembly from a first building machine 16. Accordingly the transfer box 15 has a carrier ring 30 (see FIG. 2) which is expandable and contractable to pick up and release the annular breaker/tread assembly from a concentric location within the ring. The turret then conveys the transfer box 15 with breaker/tread assembly in-situ to other positions in which other components are added to the breaker/tread assembly. The carrier ring 30 is accurately located in the transfer box by four adjusters 31. The first building machine 16 has a drum 17 for building a breaker belt and tread assembly thereon. The drum 17 is movable inwardly and outwardly along its axis of rotation, which is normal to a radius from axis 'A' of the turret, between an inward position, as illustrated, at which the breaker belt/tread assembly is made and an outwardly extended transfer position in which it becomes concentric with the carrier ring 30 in the transfer box 15.

The transfer box 15 is mounted on a carriage 18 which is radially slidable on a slideway 21 on the turret 11, and a like radial slideway 21A on a support bed 19 on the first building machine 16, so that when said one location 14 on the turret 11 accommodating the transfer box is aligned with the first building machine, and the transfer box is oriented in a radial plane with respect to the turret, the transfer box 15 can slide from the turret as illustrated, to the first machine as shown in dotted line in FIG. 2. This movement is guided by vertical rollers 28 mounted on the slideways 21. The transfer box 15 is resiliently mounted by spring means 20 to lift it upwards away from the carriage 18, and can be made to seat on the carriage by operation of fluid actuators 22 on both the turret and the first building machine 16. Both the turret 11 and the support bed 19 have location dowels 23 thereon which co-operate with apertures 24 in the transfer box to accurately locate the transfer box on the slideways 21 and 21A with respect to the drum 17 and the turret 11. When the transfer box is accurately located the fluid actuators 22 push the transfer box against the bias of the spring means 20 to lock the dowels 23 into the apertures 24 to ensure accurate location of the transfer box 15 and hence the carrier ring 30 on both the turret and the first building machine 16.

The turret 11 is rotatable anti-clockwise from the first building machine to a second position around the turret aligned with a second building machine 26, having a building drum 27 thereon on which the tire sidewalls are located. The drum 27 is axially movable on the machine 26 with respect to its own axis of rotation which is aligned radially of the turret, from a position as shown in FIG. 1 at which the tire sidewalls are placed on the drum 27 to a position in which the drum 27 is concentric with the carrier ring 30 in the transfer box 15, the transfer box bing oriented in a plane normal (as shown in FIG. 1) to a radius struck from the axis 'A' of rotation of the turret 11.

In a third position around the turret, anti-clockwise of the second position, there is located a third tire building machine 36 having a tire carcass building and shaping drum 37 thereon. A tire carcass is built on the drum 37, which is axially movable on the machine 36 with respect to its own axis of rotation which is also aligned radially of the turret 11, from a position as shown, in which a tire carcass for a radial tire is carried thereon, to a position in which the drum 37 is concentric with the carrier ring in the transfer box 15, with the transfer box being oriented in a plane normal to a radius struck from the axis 'A' of the turret 11.

The operation of the apparatus will now be described.

The three tire building machines 16, 26 and 36 each have annular tire components on their respective drums 17, 27 and 37. The first tire building machine 16 has an annular breaker/tread assembly on its drum 17. The second tire building machine 26 has a pair of annular sidewalls laid around the drum 27 as described in detail in published GB patent application 2142590A. The third tire building machine has a tire carcass assembly in cylindrical form on its drum 37.

We begin the building cycle with the transfer box 15 located at position 14 on the turret aligned with the first building machine 16. The transfer box 15 is then oriented into a radial plane (as illustrated in FIG. 1) and is released from its locating dowels 23 on the slideway 21 on the turret 11 by operation of the respective actuator 22. The transfer box 15 the slides on its carriage 18 radially onto the support bed 19 on the first building machine 16 and is located on its dowels 23 on the slideway 21 by operation of the respective actuator 22. The carrier iing 30 is then accurately located coaxially relative to the drum 17. The drum 17 then moves axially forward into a position in which it is concentric with the carrier ring 30, and the breaker/tread assembly is transferred to the carrier ring 30. The drum 17 is then rretracted, the transfer box is released from its location dowels 23 on the first machine 16 and is moved back onto its location on the turret 11. The transfer box 15 and its carriag 18 are then rotated through 90° so that the transfer box 15 lies in plane normal to a radius from axis 'A' of the turret.

The turret 11 is then indexed anti-clockwise until the position 14 is aligned with the second building machine 26, so that the carrier ring 30 with hhe breaker/tread assembly in-situ is coaxially aligned with the building drum 27. The drum 27 is then moved forward axially to a position in which it is concentric with the carrier ring 30 in a predetermined axial position and hence is accurately located relative to the breaker/tread assembly in the carrier ring 30. The drum 27 is then expanded within the carrier ring 30 to apply the sidewalls to the inner surface of the tread/breaker assembly. The drum 27 is then collapsed and is then retracted axially to its original position on the second building machine.

The turret 11 is then indexed anti-clockwise until position 14 is aligned with the third building machine 36 so that the carrier ring 30 with the breaker/tread and sidewalls assembled in-situ is coaxially aligned with the building drum 37. The drum 37 is then moved axially forward until it is concentric with the carrier ring 30 in a predetermined axial position and is hence located accurately with respect to the assembly in the carrier ring. The cylindrical carcass ply on the drum 37 is then shaped into a toroidal configuration so that it adheres to the tread, breaker and sidewall in the carrier ring 30. The carrier ring 30 then releases the breaker/tread and the drum 37 retracts with the toroidal half assembled tire thereon, which is subsequently passed on to a further operation. The carrier ring 30 in the transfer box 15 is now empty at the third building machine and is indexed around to the first tire building station and the cycle begins again.

I claim:

1. A method of manufacture of a pneumatic tire in which an annular component is accurately located in a transfer box and other tire components are arranged coaxially of the annular component and assembled thereto while said component is held in the box, the box being attachable to a conveyor means and having location means whereby said box is accurately locatable on the conveyor means, the box also being detachable and separable from the conveyor means and being accurately locatable at a tire building station, said method including the steps of moving the transfer box by the conveyor means between a plurality of tire building stations; detaching and separating said box from the conveyor means at at least one of said stations;

transferring the box from the conveyor means to said at least one station;

accurately locating the box at said station for pick-up of a tire component;

releasing the box from its location, and returning the box with component in situ to the conveyor means;

and accurately relocating the box on the conveyor means for subsequent conveyance to another tire building station.

2. A method of manufacture as claimed in claim 1 including moving the transfer box by means of the conveyor between a first tire building station and plurality of other tire building stations, in which the transfer box is detached from the conveyor means and transferred to the first tire building station to pick up an annular component;

subsequently returning the transfer box to a location on the conveyor means;

and then moving the transfer box by means of the conveyor between the other tire building stations for the assembly of other components to said annular component without further detaching the transfer box from the conveyor means.

3. A method of manufacture as claimed in claim 2, wherein the annular component is a breaker/tread assembly.

4. A method as claimed in claim 3 wherein said plurality of other tire building stations include a second station at which sidewalls are added to the breaker/tread assembly which is in situ in the transfer box, and a third tire building station at which a tire carcass subassembly is shaped up within the transfer box to assemble the carcass to the breaker/tread assembly and sidewalls.

5. A method as claimed in claim 4 wherein the conveyor means is a rotatable turret having at least three positions thereon at which the transfer box is locatable, the turret being indexable between the three tire building stations, and the transfer box is selectively orientable with respect to a radius struck from the axis of rotation of the turret, wherein during the indexing movement of the turret the transfer box is oriented in a plane normal to said radius, and during detachment and subsequent transfer to and from the first tire building station and relocation onto the turret, the transfer box is oriented in a said radial plane.

6. A method as claimed in claim 5 wherein said first tire building station includes a former having its longitudinal axis tangential of the turret, said method including building an annular component on the former, moving the transfer box radially of the turret so that the transfer box is coaxial with the former, moving the former tangentially of the turret to place the former concentrically within the transfer box, transferring the annular component to the transfer box, withdrawing the former and then returning the transfer box to the conveyor.

7. A method as claimed in claim 6 wherein the transfer box is returned to the same location on the conveyor means from which it was detached.

* * * * *